United States Patent
Genster et al.

(10) Patent No.: US 8,242,652 B2
(45) Date of Patent: Aug. 14, 2012

(54) COUPLING DEVICE FOR THE TRANSMISSION OF TORQUE, AND METHOD FOR THE TRANSMISSION OF TORQUE USING SUCH A COUPLING DEVICE

(75) Inventors: Albert Genster, Marl (DE); Andreas Burger, Krefeld (DE); Gerd Schuessler, Obernburg (DE); Stefan Pedall, Karlstein (DE); Michael Prokopp, Worms (DE)

(73) Assignee: Pierburg GmbH, Neuss (DE)

( * ) Notice: Subject to any disclaimer, the term of this patent is extended or adjusted under 35 U.S.C. 154(b) by 382 days.

(21) Appl. No.: 12/669,552

(22) PCT Filed: May 29, 2008

(86) PCT No.: PCT/EP2008/056596
§ 371 (c)(1),
(2), (4) Date: Feb. 24, 2010

(87) PCT Pub. No.: WO2009/010333
PCT Pub. Date: Jan. 22, 2009

(65) Prior Publication Data
US 2010/0207473 A1   Aug. 19, 2010

(30) Foreign Application Priority Data
Jul. 17, 2007  (DE) .......................... 10 2007 033 676

(51) Int. Cl.
*H02K 49/04* (2006.01)

(52) U.S. Cl. ............................. 310/106; 310/77; 310/92
(58) Field of Classification Search .......... 310/103–106, 310/92, 93, 77
See application file for complete search history.

(56) References Cited

U.S. PATENT DOCUMENTS

| 3,890,515 A  * | 6/1975  | Fehr et al. ..................... 310/104 |
| 5,523,636 A    | 6/1996  | Nelson |
| 5,714,820 A  * | 2/1998  | Mitsuhashi et al. .......... 310/105 |
| 6,661,144 B1 * | 12/2003 | Diener et al. ................. 310/105 |
| 7,841,456 B2 * | 11/2010 | Pescheck et al. ............. 192/48.2 |
| 2007/0095319 A1 | 5/2007 | Eichenberg et al. |
| 2008/0210512 A1 | 9/2008 | Pescheck et al. |

FOREIGN PATENT DOCUMENTS

| DE | 39 05 216 A1     | 9/1989  |
| DE | 10 2004 057 848 A1 | 6/2006 |
| JP | 10 150762 A      | 6/1998  |
| WO | WO 2005/113944 A1 | 12/2005 |

* cited by examiner

*Primary Examiner* — Dang Le
(74) *Attorney, Agent, or Firm* — Norman B. Thot

(57) ABSTRACT

A coupling device for the transmission of torque. The coupling device includes a drivable rotor part, an output shaft rotatably connected with an armature part, a hysteresis part disposed on the armature part, permanent magnets configured to generate a magnetic field through which magnetic field a torque can be transmitted from the rotor part to the armature part, a stator part in which an electromagnet is disposed, the electromagnet being configured to induce a magnetic flux in the rotor part so as to adjust a torque from the rotor part to the armature part, and a synchronous coupling disposed between the stator part and the armature part.

10 Claims, 1 Drawing Sheet

COUPLING DEVICE FOR THE TRANSMISSION OF TORQUE, AND METHOD FOR THE TRANSMISSION OF TORQUE USING SUCH A COUPLING DEVICE

CROSS REFERENCE TO PRIOR APPLICATIONS

This application is a U.S. National Phase application under 35 U.S.C. §371 of International Application No. PCT/EP2008/056596, filed on May 29, 2008 and which claims benefit to German Patent Application No. 10 2007 033 676.6, filed on Jul. 17, 2007. The International Application was published in German on Jan. 22, 2009 as WO 2009/010333 A1 under PCT Article 21(2).

FIELD

The present invention refers to a coupling device for the transmission of torque comprising a drivable rotor part, an output shaft connected for rotation with an armature to which a hysteresis part is mounted, permanent magnets generating a magnetic field via which a torque can be transmitted from the rotor part to the armature, and a stator part in which an electromagnet is arranged by means of which a magnetic flux can be induced in the rotor part, which magnetic flux serves to adjust a torque from the rotor part to the armature part. The present invention further refers to a method for the transmission of torque to an auxiliary aggregate of a vehicle comprising such a coupling device.

BACKGROUND

The coupling devices are known in various designs. A major advantage is the contactless transmission of torque via the air gap between the hysteresis part and the rotor part. Operation is based on the effect of magnetic fields building up and poles attracting each other in synchronous operation or on the continuous magnetic reversal of the hysteresis part moving past the magnets in the slip mode of operation.

DE 39 05 216 A1 describes an electrically controllable hysteresis coupling that is used to control tensile forces in winding operations. This hysteresis coupling serves to couple a drive shaft with an output shaft coaxial therewith. The drive shaft is mounted with an armature part having a hysteresis part connected therewith which corresponds to a rotor part in which magnets are arranged. The action of force of the magnets can be varied via a coil fixedly arranged in a housing, whereby the slip of the hysteresis coupling and thus the number of rotations of the output shaft can be adjusted with respect to the drive shaft. In this structure, the permanent magnets are arranged radially on either side of a hysteresis ring rotating contactlessly in an axial groove.

Such a design is disadvantageous, however, in that, even when the voltage applied to the coil is turned off, the permanent magnets still transmit a torque from the drive shaft to the output shaft. Even with a negative energizing of the coil, this moment cannot be eliminated completely.

DE 10 2004 057 848 A1 describes an adjustable hysteresis coupling which in particular serves to drive auxiliary aggregates of a vehicle. In this design, a rotor part is driven which has a gap into which a hysteresis part extends, which hysteresis part is fastened to an armature secured to an output shaft. A coil generates a magnetic field which continuously reverses the polarity of the hysteresis ring while the rotor part is driven, so that the coupling operates in the slip mode. In order to guarantee the rotation of the output shaft, for instance for driving a coolant pump, even if the current fails, an additional permanent magnet is arranged in the stator behind the coil, which also generates an electromagnetic field acting on the hysteresis part. However, this has the effect that it is not possible, for instance, in case of a cold start of an internal combustion engine, to completely stop the pump from conveying, i.e., to transmit no rotation. Besides this electromagnetic failsafe safety measure, a mechanical failsafe security measure using a friction clutch is also described.

A disadvantage of both designs described above is that either a start-up of the output shaft at the beginning of the rotor movement cannot be prevented or that a transmission of torque is not guaranteed in the event of a current failure.

SUMMARY

An aspect of the present invention is to provide a coupling device that is variable over as large a range as possible and which, on the one hand, ensures a constant transmission of torque in the event of a current failure and, on the other hand, is adapted at the same time to completely prevent a transmission of torque after a previous standstill of the rotor part.

In an embodiment, the present invention provides a coupling device for the transmission of torque. The coupling device includes a drivable rotor part, an output shaft rotatably connected with an armature part, a hysteresis part disposed on the armature part, permanent magnets configured to generate a magnetic field through which magnetic field a torque can be transmitted from the rotor part to the armature part, a stator part in which an electromagnet is disposed, the electromagnet being configured to induce a magnetic flux in the rotor part so as to adjust a torque from the rotor part to the armature part, and a synchronous coupling disposed between the stator part and the armature part.

BRIEF DESCRIPTION OF THE DRAWINGS

The present invention is described in greater detail below on the basis of embodiments and of the drawings in which.

DETAILED DESCRIPTION

Figure 1:
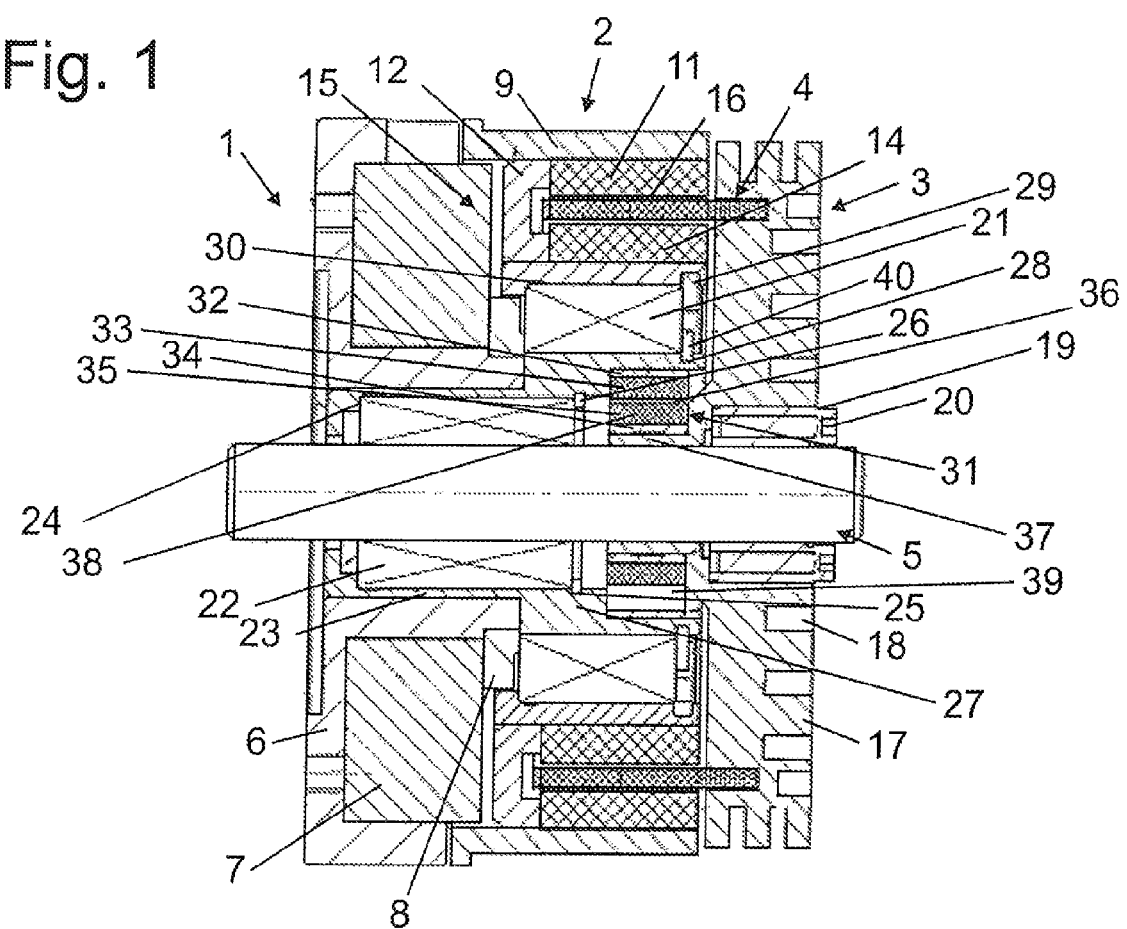
FIG. 1 is a sectional side elevational view of a coupling device for torque transmission according to the present invention.

Synchronous couplings transmit torques through magnetic forces generated between periodically arranged opposite permanent magnets. When a rated moment of such a synchronous coupling is exceeded, the magnetic forces are interrupted almost completely so that the coupling slips and transmits but a very low residual moment. By arranging such a synchronous coupling between the stator part and the armature part, it becomes possible use this synchronous coupling as a brake after a standstill of the rotor part. This requires the coil to be supplied with negative current before the rotor part starts to move. The magnetic field of the permanent magnets acting on the hysteresis part, which thus decays, is therefore not greater than the holding torque of the synchronous coupling, so that only after a certain rated moment has been exceeded, the armature part and thus the output shaft are moved by correspondingly energizing the electromagnet. Without the use of such a synchronous coupling, the action of the force of the permanent magnets in the rotor part could not be cancelled completely by the coil, since this would require an infinitely high negative voltage.

In an embodiment of the present invention, the synchronous coupling is formed by an inner ring with a plurality of permanent magnets fastened to the armature part and an outer partial ring formed by a plurality of permanent magnets that is fastened to the stator part, an air gap being provided between the ring and the partial ring. The use of fewer magnets on the stator part reduces the holding torque of the synchronous coupling to a desired value that depends on the defined negative voltage at the electromagnet which has to be applied to the same. At the same time, the arrangement of the magnets as a partial ring at the stator part makes it possible to obtain a clearly smoother running of the coupling device when the output shaft rotates, since the detent torques are reduced in operation, thereby avoiding an unbalance by the arrangement of the partial ring on the stator part.

In an embodiment of the present invention, the hysteresis part is formed as a flat ring whose first axial end is fastened to the armature part and whose second axial end extends into a gap in the drivable rotor part, the rotor part being designed as a soft magnetic toothed profile at the sides radially opposite the gap, with the permanent magnets being fastened in the interstices of the profile. With such an arrangement, very little slip losses are achieved when transmitting torque between the rotor part and the armature part while the coil is not energized.

In an embodiment of the present invention, the rotor part may be driven by a belt drive and is rotatably supported on the stator part through the first bearing unit, the first bearing unit being arranged axially inside the dimension of a pulley. This results in a smooth running of the output shaft in operation, since no bending moments caused by the wrap of the belt drive act on the output shaft.

In an embodiment of the present invention, the output shaft can be rotatably supported by a second bearing unit within the stator part, the second bearing unit being arranged at least in part axially within the dimension of the first bearing unit. This also results in a steady, smooth running of the output shaft and moreover reduces the required axial installation space.

In an embodiment of the present invention, the coupling device can serve to transmit torque to an auxiliary aggregate, in particular a coolant pump of a motor vehicle. When such a coupling device is used for a coolant pump, the synchronous coupling prevents a transmission of rotations between the rotor part and the armature part after a cold start of the internal combustion engine, which results in a faster heating of the internal combustion engine after a cold start. Moreover, it is ensured that the coolant pump still conveys in the event of a failure of the current supply to the coil.

In an embodiment, the present invention provides for a method for driving an auxiliary aggregate which ensures a standstill of the pump after a cold start. This is achieved by a method wherein, upon a standstill of the rotor part, the coil is energized by a defined negative voltage by which the magnetic field generated in the hysteresis part by the permanent magnets is weakened such, upon a subsequent rotation of the rotor part, that the entire torque generated in the hysteresis part is neutralized by the holding force of the synchronous coupling. With the holding force of the synchronous coupling laid out correctly and with the resulting torque between the rotor part and the armature part—and thus with a correct layout of the negative voltage to be applied to the coil—such a method makes it possible to prevent the coolant pump from running along in the event of a cold start of an internal combustion engine, whereby a faster heating of the internal combustion engine is achieved.

In an embodiment of the present invention, an increase in the voltage towards the positive range causes an exceeding of the holding moment of the synchronous coupling so that a torque is transmitted to the armature part via the hysteresis part, whereby the subsequent rotation of the armature part breaks the holding moment of the synchronous coupling. Thus, the pump can convey without having to continuously work against an existing holding force so that, compared to other brakes, substantial amounts of current can be saved by using a hysteresis coupling with an electromagnet.

Moreover, with the coil not energized, the permanent magnets transmit a torque to the armature part, whereby the drive shaft is driven with a constant torque. Thus, upon a failure of the current supply to the coil, the coolant pump is still operated at a rotation for this pump resulting from this torque. As a consequence, in the event of a current failure, the internal combustion engine can be operated further with reduced power without overheating so that the driver of a motor vehicle would be able to drive to the next repair shop.

A coupling device and a method for the transmission of torque by means of such a coupling device are thus provided which allow both to hold the output shaft after a standstill of the rotor part and to transmit a torque if the coil should fail. Moreover, an adjustable coupling device is provided that is robust, has a long service life and is compact.

Figure 2:
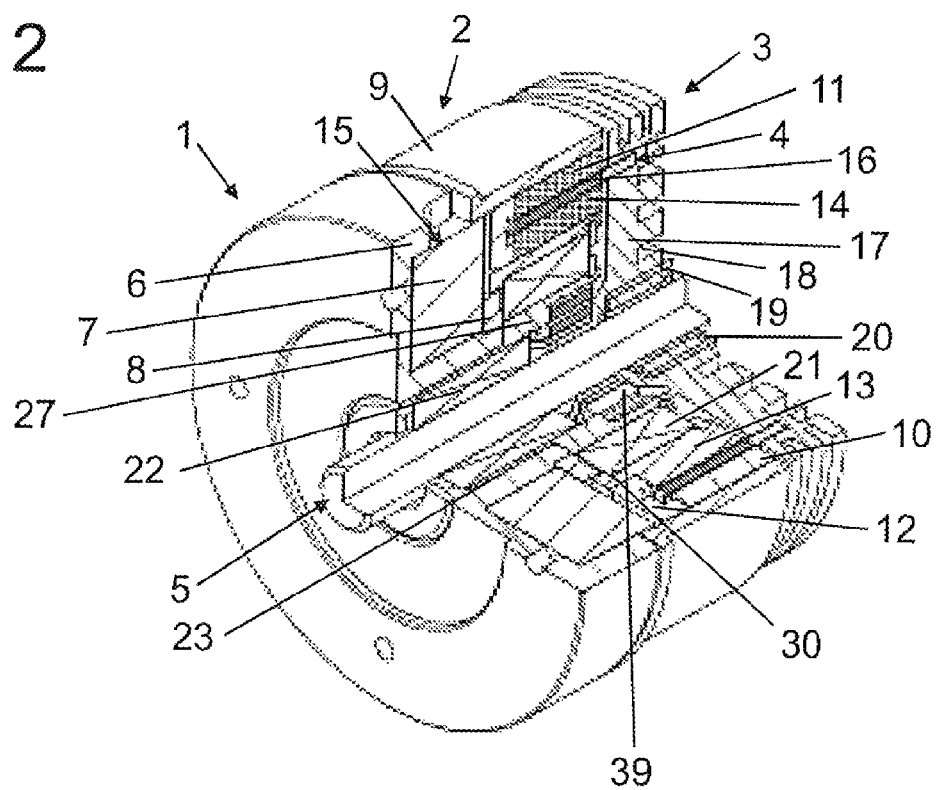
FIG. 2 is a partly cut perspective view of the coupling device according to the present invention illustrated in FIG. 1.

FIGS. 1 and 2 illustrate a coupling device according to the invention, which is formed substantially by a stator part 1, a rotor part 2, an armature part 3 with a hysteresis part 4, and an output shaft 5.

The stator part 1 comprises a coil housing 6 delimiting a coil 7 both axially and radially on the inside and the outside. At the axially open side of the coil housing 6, a coil housing cover 8 is provided that fixes the coil 7 in the coil housing 6. Both the coil housing 6 and the coil housing lid 8 are soft magnetic components.

The stator part 1 is joined in the axial direction by the rotor part 2 which is composed of a pulley 9 and an outer ring 10 located radially on the inside, both being connected in a press fit. The outer ring 10 has a radially inward directed toothed profile in whose interstices permanent magnets 11 are arranged equally distributed over the circumference. Of course, the pulley 9 and the outer ring 10 may be integral.

The outer ring 10 is connected with a spacer ring 12, for example, by welding. This spacer ring 12 is made of a non-magnetic material and serves to connect the outer ring 10 with an inner ring 13 which, like the outer ring 10, is of a soft magnetic material. The spacer ring 12 is arranged at the axial side of the rotor part 2 directed towards the coil 7 and is also fixedly connected with the inner ring 13, for example, by welding.

The inner ring 13 comprises a radially outward directed toothed profile in whose interstices permanent magnets 14 are arranged. In an embodiment of the present invention, a number of permanent magnets corresponding to that of the outer ring is distributed evenly over the circumference of the inner ring 13.

With its coil housing parts 6 and 8 and the soft magnetic outer ring 10 and the soft magnetic ring 13, the coil 7 forms an electromagnet 15.

Located radially between the outer ring 10 and the inner ring 13 or the permanent magnets 11 and 14 is a gap 16 into which the hysteresis part 4 projects while leaving an air gap between the inner ring 13 and the outer ring 10, the hysteresis part being a flat ring in the an embodiment. To avoid electromagnetic losses, this air gap should be designed as small as possible.

The hysteresis part 4 thus projects axially into the rotor part 2, whereas the opposite axial end of the hysteresis part 4 is fastened in the armature part 3. This armature part 3 substantially comprises a disc 17 with cooling ribs 18 to enhance the dissipation of heat. This disc 17 is fastened on the output shaft 5 by means of set screws 20 via a clamping sleeve 19. Of course, a fastening by means of a press fit is also conceivable.

The rotor part 2 or the output part 5 is supported through a first bearing unit 21 for supporting the rotor part 2 and a second bearing unit 22 for supporting the output shaft 5.

The second bearing unit 22 is thus situated between the output shaft 5 and a bearing bushing 23 fixedly connected with the coil housing 6, whereby it is a part of the stationary stator part 1. This bearing bushing 23 is formed with a shoulder 24 and a groove 25 in which a retaining ring 26 is arranged so that the second bearing unit 22 or the outer ring thereof is fixed axially in the bearing bushing 23. The bearing bushing 23 has a portion 27 of larger outer diameter that joins the coil housing 6 in the axial direction, wherein the first bearing unit 27 for supporting the rotor part 2 is arranged on this portion 27. This first bearing unit 21 is fixed with respect to its inner ring, not illustrated, by the coil housing lid 8 or, on the axially opposite side, by a further retaining ring 40 arranged in a groove 28 of the bearing bushing 23. The outer ring of this first bearing unit 21 is fixed by another retaining ring 29 and a correspondingly formed shoulder 30 on the inner ring 13. The rotor part 2 is thus supported on the bearing unit 21 via its inner ring 13.

According to the present invention, the coupling is additionally provided with a synchronous coupling 31 formed by a first sleeve 32 with permanent magnets 33 arranged on its inner circumference, as well as by a second sleeve 34 with permanent magnets 35 arranged on its outer circumference. A gap 36 exists between the permanent magnets 33, 35. The outer first sleeve 32 is securely fixed to the radially inner side of the bearing bushing 23 of the stator part 1, whereas the second radially inner sleeve 34 is fixedly arranged on a protrusion 37 of the armature part 3. This protrusion extends axially from the disc 17 towards the stator part 1. This means that the permanent magnets 33 which are fixedly arranged in the sleeve 32 are not arranged for movement in the static part of the coupling device, whereas the permanent magnets 35 rotate with the second sleeve 34 when the armature 3 moves.

In contrast with the inner permanent magnets 35, the magnets 33 of the synchronous coupling 31 do not form a ring 38 with equal distances between the permanent magnets, but merely form an outer partial ring 39. In an embodiment of the present invention, the inner co-rotating ring 38 is formed by ten magnets 35 which are equally distributed over the 360°. The outer partial ring 39, however, extends only over 144° and is formed by five magnets 33 equally distributed over the 144°. This results in a reduction of the holding force of the synchronous coupling acting as a brake and in a clearly less noisy running when the output shaft 5 is operated. In order to avoid an unbalance, the partial ring 39 is formed at the static part of the synchronous coupling 31.

The functioning of the coupling device will be described hereinafter for the use as a drive of a cooling water pump in an internal combustion engine.

Upon a cold start of the internal combustion engine, it is desired that the cooling water pump does not convey any cooling water. Accordingly, no torque should be transmitted from the rotor pat 2 to the output shaft 5. This is achieved by energizing the coil 7 with a defined negative voltage prior to the starting of the internal combustion engine and thus before the rotor part 2 starts, whereby the action of the permanent magnets 11, 14 on the hysteresis part 4 is clearly reduced through the teeth of the inner ring 13 and the outer ring 14, respectively.

In order to achieve a complete prevention of a torque transmission in this manner, it would be necessary to apply an infinitely high negative voltage to the coil 7. Since this is not possible, the negative voltage applied to the coil 7 is limited to a fixed value. In order to still prevent the armature part 3 from rotating with the rotor 2 after the start of the internal combustion engine, the synchronous coupling 31 applies a holding moment which is at least as great as the residual torque acting on the armature part 3. This holding moment is applied at standstill by the permanent magnets 33, 35 and their force of attraction.

As soon as the cold start phase of the internal combustion engine has ended and a limit temperature of the cooling water is reached, the cooling pump has to convey. To do this, the voltage applied to the coil 7 is increased, whereby the torque acting on the armature part is increased and eventually exceeds the holding moment of the synchronous coupling 31. As a result, the subsequent rotation of the armature part 3 breaks the holding force of the synchronous coupling 31 so that the permanent magnets 11, 14 or the teeth of the inner and the outer ring 13, 10 passing the hysteresis part 4 cause a continuous magnetic reversal in the hysteresis part 4 and a transmission of a torque without a greater braking effect by the synchronous coupling 31. The magnitude of the slip caused in the process depends on the voltage applied to the coil 7. This means that the number of rotations of the armature part 3 and thus of the output shaft 5 can be controlled up to a maximum number of rotations, where no slip occurs, by varying the voltage applied to the coil 7.

The driving power required for a cooling according to the needs, together with the slip losses occurring, is substantially lower than the drive power to be applied for an uncontrolled pump. Another advantage of this structure is that, in the event of a failure of the electric power supply to the coil 7, a magnetic field still acts on the hysteresis part 4 through the permanent magnets 11, 14, which is sufficient for the transmission of a reduced torque. In such a case, the cooling water pump operates with a fixed torque so that the driver of the vehicle need not fear an overheating of the internal combustion engine.

The arrangement of the bearing units 21, 22 both ensures a smooth rotation of the output shaft 5 or the rotor part 2 and the armature part 3 is ensured and that the axial installation space is greatly minimized A coupling device thus configured allows for a low-loss adaptation of the coolant conveyance to the respective state of operation of an internal combustion engine.

Certain structural modifications can be made, while, according to the present invention, the functionality of the hysteresis coupling and the synchronous coupling should be preserved.

The present invention is not limited to embodiments described herein; reference should be had to the appended claims.

The invention claimed is:

1. A coupling device for the transmission of torque, the coupling device comprising: a drivable rotor part; an output shaft rotatably connected with an armature part; a hysteresis part disposed on the armature part; permanent magnets configured to generate a magnetic field through which magnetic field a torque can be transmitted from the rotor part to the armature part; a stator part in which an electromagnet is disposed, the electromagnet being configured to induce a magnetic flux in the rotor part so as to adjust a torque from the rotor part to the armature part; and a synchronous coupling disposed between the stator part and the armature part.

2. The coupling device as recited in claim 1, wherein the synchronous coupling comprises: an inner ring having a plurality of permanent magnets, the inner ring being affixed to the armature part; and an outer partial ring having a plurality of permanent magnets, the outer ring being affixed to the stator part, wherein an air gap is provided between the inner ring and the outer partial ring.

3. The coupling device as recited in claim 1, wherein the drivable rotor part is formed as a magnetic toothed profile on the sides radially opposite a gap and wherein the hysteresis part includes a radially flat ring with a first axial end affixed to the armature part and a second axial end extending into the gap in the drivable rotor part, and wherein the permanent magnets are respectively affixed in interstices of the magnetic toothed profile.

4. The coupling device as recited in claim 1, further comprising a belt drive and a first bearing unit, wherein the rotor part is drivable through the belt drive and is rotatably supported on the stator part by the first bearing unit, the first bearing unit being arranged axially within the dimensions of a pulley of the rotor part.

5. The coupling device as recited in claim 1, further comprising a second bearing unit, wherein the output shaft is rotatably supported by the second bearing unit within the stator part, the second bearing unit being arranged at least partly axially within the dimensions of the first bearing unit.

6. The coupling device as recited in claim 1, further comprising an auxiliary aggregate wherein the output shaft transmits a torque to the auxiliary aggregate.

7. The method of using as recited in claim 6, wherein the auxiliary aggregate is a coolant pump of a motor vehicle.

8. A method for the transmission of torque, the method comprising: providing a coupling device for the transmission of torque, the coupling device including a drivable rotor part, an output shaft rotatably connected with an armature part, a hysteresis part disposed on the armature part, permanent magnets configured to generate a magnetic field through which magnetic field a torque can be transmitted from the rotor part to the armature part, a stator part in which an electromagnet is disposed, the electromagnet being configured to induce a magnetic flux in the rotor part so as to adjust a torque from the rotor part to the armature part, and a synchronous coupling disposed between the stator part and the armature part; applying a negative voltage to a coil when the rotor part is not rotating; rotating the rotor part so as to weaken the magnetic field generated by the permanent magnets in the hysteresis part; and cancelling the entire torque generated in the hysteresis part by a holding moment of the synchronous coupling.

9. The method as recited in claim 8, further comprising: increasing the voltage towards the positive range so as to exceed the holding moment of the synchronous coupling; transmitting torque to the armature part via the hysteresis part; and breaking the holding moment of the synchronous coupling by subsequently rotating the armature part.

10. The method as recited in claim 8, further comprising: transmitting a torque to the armature part via the permanent magnets when no voltage is applied to the coil; and driving the output shaft at a fixed number of rotations.

* * * * *